United States Patent [19]
Hashimoto et al.

[11] Patent Number: 4,731,665
[45] Date of Patent: Mar. 15, 1988

[54] IMAGE SENSING APPARATUS WITH READ-OUT OF SELECTED COMBINATIONS OF LINES

[75] Inventors: Seiji Hashimoto; Akira Suga, both of Yokohama, Japan

[73] Assignee: Canon Kabushiki Kaisha, Tokyo, Japan

[21] Appl. No.: 813,240

[22] Filed: Dec. 24, 1985

[30] Foreign Application Priority Data

Dec. 28, 1984 [JP] Japan ................. 59-276978
Dec. 28, 1984 [JP] Japan ................. 59-276979
Dec. 28, 1984 [JP] Japan ................. 59-276980

[51] Int. Cl.$^4$ ............................. H04N 3/14
[52] U.S. Cl. ................. 358/213.27; 358/213.28; 358/213.26
[58] Field of Search ............ 358/213, 212, 162, 166, 358/37, 48, 213.15, 213.22, 213.26, 213.29, 213.31, 213.27

[56] References Cited

U.S. PATENT DOCUMENTS

| | | | |
|---|---|---|---|
| 4,281,338 | 7/1981 | Takahashi et al. | 358/48 |
| 4,527,200 | 7/1985 | Takahashi et al. | 358/213 |
| 4,543,610 | 9/1985 | Ozawa et al. | 358/213 |
| 4,574,309 | 3/1986 | Arisawa et al. | 358/213 |

FOREIGN PATENT DOCUMENTS

| | | |
|---|---|---|
| 150878 | 11/1981 | Japan . |
| 157073 | 12/1981 | Japan . |
| 165473 | 12/1981 | Japan . |
| 0143675 | 8/1983 | Japan .................. 358/48 |

Primary Examiner—Jin F. Ng
Assistant Examiner—Stephen Brinich
Attorney, Agent, or Firm—Fitzpatrick, Cella, Harper & Scinto

[57] ABSTRACT

An image sensing apparatus of the invention has a photoelectric conversion device including a plurality of photoelectric conversion elements, arranged in a matrix pattern, and output terminals for simultaneously reading out signals of a plurality of lines. A control circuit simultaneously reads out the signals of the lines of the photoelectric conversion device. An edge signal generating circuit receives the signals of the lines, operating them and generating an edge-corrected signal. A switch switches the connection between the output terminals of the photoelectric conversion device and the input of the edge signal generating circuit, in correspondence with a change in the combination of the lines to be read out. The apparatus has a simple configuration and can perform signal processing such as edge correction.

13 Claims, 20 Drawing Figures

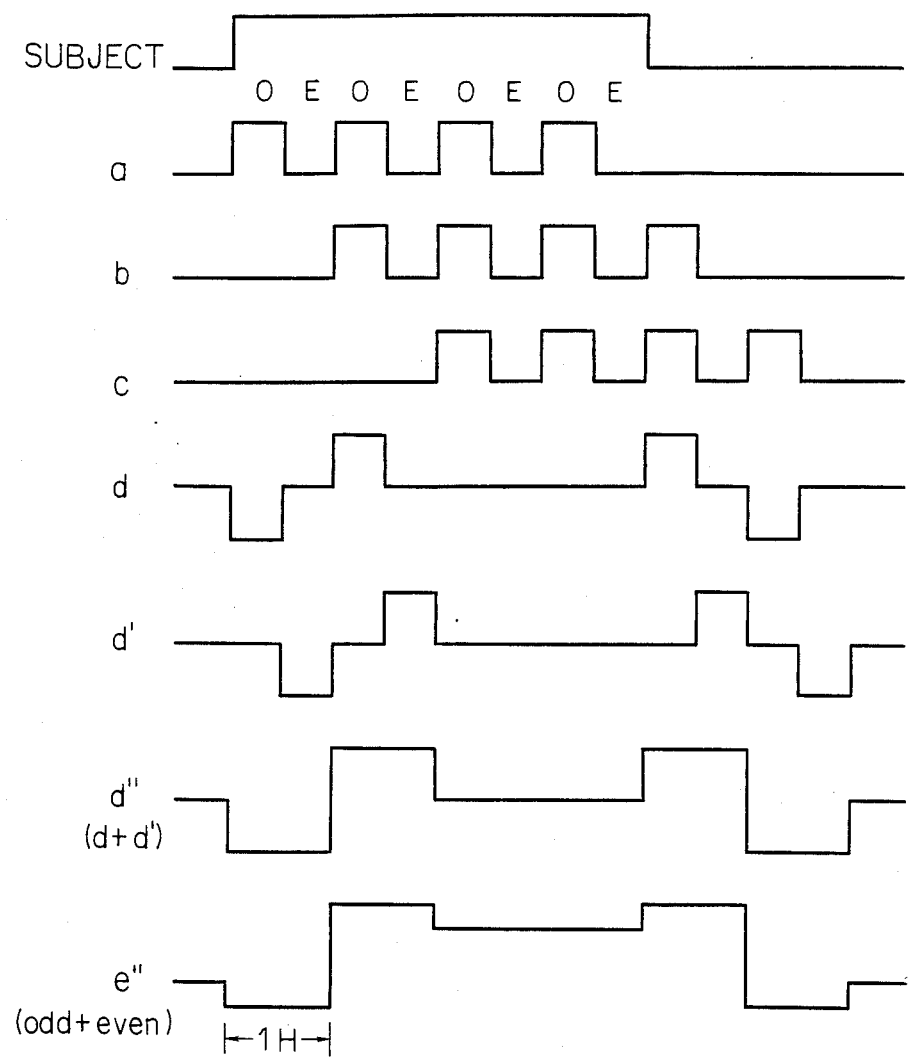

IMAGE SENSING APPARATUS WITH READ-OUT OF SELECTED COMBINATIONS OF LINES

BACKGROUND OF THE INVENTION

1. Field of the Invention

The present invention relates to an image sensing apparatus using a photoelectric conversion element having a photoelectric charge storage region in which a potential is controlled by a capacitor.

An image sensing apparatus according to the present invention is applicable to image input devices, workstations, digital copying machines, wordprocessors, bar code readers, and automatic focusing photoelectric conversion object detection devices for cameras, video cameras, 8-mm movie cameras, and the like.

2. Description of the Prior Art

Research on photoelectric conversion devices and in particular on solid state sensors is concentrated on CCD and MOS devices.

In a CCD sensor, a potential well is formed below a MOS capacitor electrode. A charge generated upon reception of light is stored in the well. During readout, the potential wells are sequentially operated by pulses applied to the electrodes, and the stored charges are transferred to an output amplifier. The CCD sensor therefore has a relatively simple structure, generates low noise, and allows image sensing at low illuminances.

The operation principle of a MOS sensor is as follows. Upon reception of light, charges are stored in photodiodes of p-n junctions constituting light-receiving sections. During readout, MOS switching transistors connected to the respective diodes are sequentially read out to an output amplifier. Therefore, a MOS sensor has a more complex structure than a CCD sensor. However, a MOS sensor can have a high storage capacity and wide dynamic range.

The two types of conventional sensors described above have the following drawbacks, which have prevented further improvement in resolution.

A CCD sensor has the following drawbacks. (1) Since a MOS amplifier is formed on a chip as an output amplifier, 1/f noise is generated from the interface between the Si and the silicon oxide film, thus interfering with normal display. (2) When the number of cells is increased and cells are integrated at a high speed in order to provide high resolution, the maximum charge amount which can be stored in a single potential well is reduced and a wide dynamic range cannot be obtained. (3) Since a CCD sensor has a structure wherein stored charges are transferred, if even a single cell fails the transferred charges stop at the failed cell. Thus, manufacturing yield is low.

A MOS sensor has the following drawbacks. (1) Since a wiring capacitance is connected to each photodiode, a large signal voltage drop occurs when a signal is read out. (2) Wiring capacitance is large, and random noise is easily generated. (3) Fixed pattern noise tends to become mixed in due to variations in the parasitic capacitance of a scanning MOS switching transistor. Hence, image sensing at low illuminances cannot be performed. When cells are reduced in size in order to allow high resolution, stored charges are reduced. However, since the wiring capacitance is not decreased very much, the S/N ratio is reduced.

Neither CCD nor MOS sensors, therefore, can provide high resolution. As a result, a semiconductor image sensing apparatus of a new type has been proposed (Japanese Laid-Open Patent Gazettes Nos. 150878/1981, 157073/1981 and 165473/1981). In an apparatus of this type, a charge generated upon light reception is stored in a control electrode (e.g., the base of a bipolar transistor, or the gate of an electrostatic induction transistor (SIT) or a MOS transistor). The stored charge is read out by charge amplification using the amplifying function of each cell. With this apparatus, high output, wide dynamic range, low noise, non-destructive read out, and high resolution can be provided.

However, this apparatus is based on an X-Y address system. In addition, each cell has a basic structure wherein an amplification element such as a bipolar transistor or an SIT transistor is coupled to a conventional MOS cell. These factors have limited improvements in resolution.

In an image sensing element capable of non-destructive read out, the width of wiring for X-Y addressing must be minimized in order to guarantee a certain opening rate of the element. For this reason, the wiring capacitance is low, and the gain of the image sensing element is limited.

As shown in FIG. 15A, in a conventional edge compensation circuit an edge emphasized signal as shown in FIG. 15B is obtained using 1H delay lines 60 and 61, adders 63, 65, and 66, a coefficient circuit 64, and a level adjustment resistor 67.

However, two expensive delay lines must be used, and the circuit configuration becomes complex.

In FIG. 15B, charts a to d show waveforms of signals in odd fields; d', an output from the adder 65 in even fields; d", an edge signal of a frame image; and e", an edge emphasized signal of a frame image.

When dust or the like is mixed in the manufacturing line for conventional photoelectric conversion devices, a white or black defect is formed in the corresponding portion, thereby impairing image quality.

In view of this problem, various defect correction methods have been conventionally proposed. For example, the defective pixel positions of each photoelectric conversion device are detected and stored in a ROM (read-only memory). When the signal is read out, a correction signal is generated to replace the corresponding signal, thereby correcting the defective pixel signal.

With this method, however, a 1h delay line is required to perform the above-mentioned correction, and the circuit configuration becomes complex.

SUMMARY OF THE INVENTION

It is an object of the present invention to provide an image sensing apparatus which is free from the drawbacks of conventional image sensing apparatuses.

It is another object of the present invention to provide an image sensing apparatus which can form an image of high quality with a simple configuration.

It is still another object of the present invention to provide an image sensing apparatus which can compensate for defective pixels with a simple configuration.

In order to achieve the above objects of the present invention, there is provided according to an embodiment thereof, an image sensing apparatus having a photoelectric conversion device including a plurality of photoelectric conversion elements which are arranged in a matrix pattern.

A control means permits simultaneous reading out of signals of a plurality of lines of the photoelectric conversion device, and a switching device switches the signals of the lines at predetermined photoelectric conversion elements.

With this arrangement, defective pixel compensation can be performed with a simple configuration. In addition, since defective pixels are replaced with signals of adjacent pixel lines having a high vertical correlation, image quality is improved.

Again, an edge signal generating may be provided, in addition to or in place of the switching system, for operating the signals of the lines and for forming an edge-corrected signal.

The edge-corrected signal can thus be generated with a device of a simple configuration. In addition, since the edge-corrected signal is obtained from signals of adjacent pixel lines having a high vertical correlation, and since the vertical correlation distance is short, the inclusion of false signals is rare. switching the output lines of the photoelectric conversion device, construction of the edge signal generating means and the photoelectric conversion device is simplified.

BRIEF DESCRIPTION OF THE DRAWINGS

FIG. 15B shows waveforms of signals at respective parts of the circuit shown in FIG. 15A.

DETAILED DESCRIPTION OF THE PREFERRED EMBODIMENTS

The preferred embodiments of the present invention will be described below with reference to the accompanying drawings.

Figure 1A:
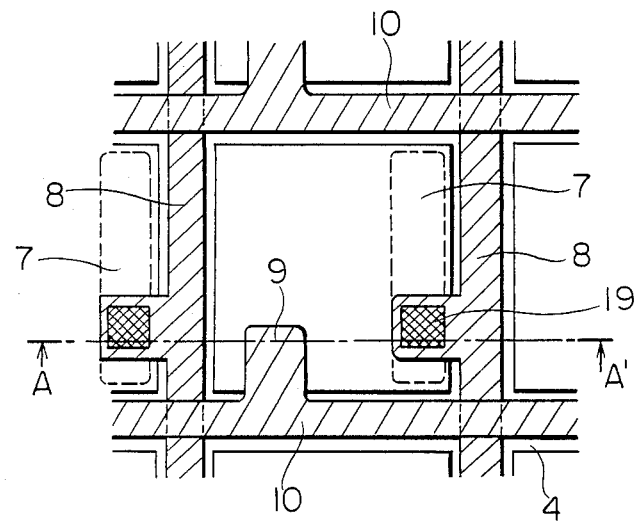
FIG. 1A is a plan view of a photosensor cell suitable for use in an embodiment of the present invention.
Figure 1B:
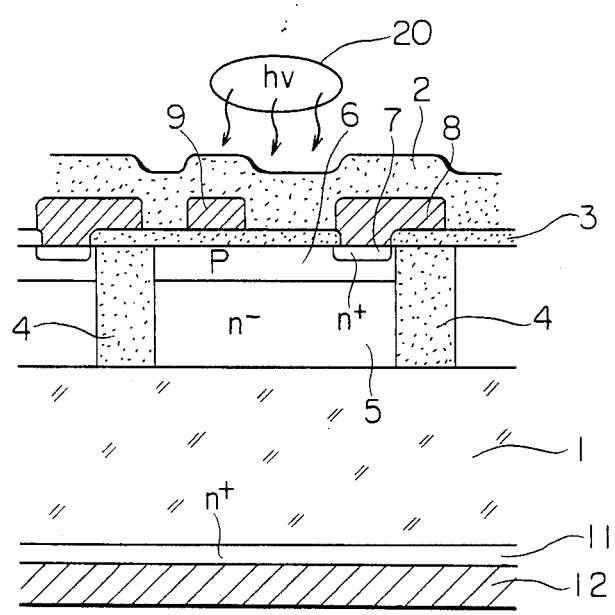
FIG. 1B is a sectional view of the cell.

FIGS. 1A and 1B are diagrams for explaining the basic structure of a photosensor cell and its operation for a photoelectric conversion device according to an embodiment of the present invention. That cell, and the description thereof provided in connection with FIGS. 1-4, are also disclosed, and the cells is claimed, in commonly assigned U.S. Pat. No. 4,686,554 (Ohmi et al.), issued Aug. 11, 1987.

Figure 2:
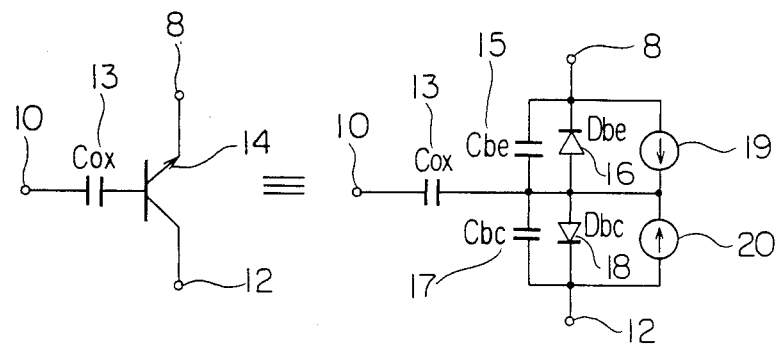
FIG. 2 is an equivalent circuit diagram of the cell.

FIG. 1A shows a plan view of a photosensor cell 100 as a photoelectric conversion element, FIG. 1B shows a sectional view of the structure in FIG. 1A along the line A-A', and FIG. 2 shows an equivalent circuit for the structure. The same reference numerals throughout FIGS. 1A, 1B, and 2 denote the same parts.

In FIG. 1, a plan view of an aligned array system is illustrated. However, in order to improve horizontal resolution, a pixel shifting (staggered) arrangement can be adopted.

The photosensor cell as shown in FIGS. 1A and 1B comprises:

a passivation film 2 which is formed of a PSG film or the like on a silicon substrate 1 and in which an impurity such as phosphorus (P), antimony (Sb) or arsenic (As) is doped to obtain a conductivity type of n or $n^+$;

an insulating oxided film 3 consisting of a silicon oxide film ($SiO_2$);

an element isolation region 4 comprising insulating films or polysilicon films consisting of $SiO_2$ or $Si_3N_4$ for electrically isolating adjacent photosensor cells;

an $n^-$-type region 5 having a low impurity concentration and formed by epitaxy;

a p-type region 6, which serves as the base of a bipolar transistor obtained by the doping of an impurity with an impurity diffusion technique or an ion-implantation technique;

an $n^+$-type region 7, which serves as the emitter of a bipolar transistor formed by an impurity diffusion technique or an ion-implantation technique;

a wiring 8 consisting of a conductive material such as Al, Al-Si, Al-Cu-Si or the like for the external readout of signals;

an electrode 9 for applying a pulse to the floating p-type region 6;

a wiring 10 for the electrode 9;

an $n^+$-type region 11 having a high impurity concentration and formed by an impurity diffusion technique or the like on the rear side of the substrate 1 to obtain an ohmic contact; and an electrode 12 for providing a substrate potential and consisting of a conductive material such as aluminum to provide a collector potential for the bipolar transistor.

A contact 19 shown if FIG. 1A connects the $n^+$-type region 7 and the wiring 8. The intersection of the wiring 8 and the wiring 10 is a double-wiring structure, and is insulated by an insulating region composed of an insulating material such as $SiO_2$. Thus, a bilayered metal wiring structure is provided.

A capacitor Cox 13 in the equivalent circuit shown in FIG. 2 has a MOS structure consisting of the electrode 9, the insulating film 3, and the p-type region 6. A bipolar transistor 14 consists of the $n^+$-type region 7 as an emitter, the p-type region 6 as a base, the n⁻-type region 5 having a low impurity concentration, and the n⁻ or n⁺-type region 1 as a collector. As can be seen from the accompanying drawings, the p-type region 6 is a floating region.

The second equivalent circuit shown in FIG. 2 is expressed by a base-emitter junction capacitance Cbe 15, a base-emitter p-n junction diode Dbe 16, a base-collector junction capacitance Cbc 17, a base-collector p-n junction diode Dbc 18, and current sources 19 and 20.

The basic operation of the photosensor cell will be described below with reference to FIGS. 1A, 1B and 2.

The basic operation of the photosensor cell involves a charge storage operation upon light reception, a read out operation, and a refresh operation. In the charge storage operation, the emitter is grounded through the wiring 8, and the collector is biased to a positive potential through the wiring 12. The base is set to a negative potential, i.e., reverse biased with respect to the emitter region 7 by applying a positive pulse voltage through the wiring 10 to the capacitor Cox 13. Biasing to the negative potential of the base 6 by application of a pulse to the capacitor Cox 13 will be described in detail with reference to the refresh operation below.

When light 20 becomes incident on the photosensor cell shown in FIG. 1B, electron-hole pairs are generated in the semiconductor. Since the n-type region 1 is biased to a positive potential, electrons flow to the side of the n-type region 1. However, holes are stored in the p-type region 6. When holes are stored in the p-type region 6 in this manner, the potential of the p-type region 6 gradually changes toward a positive potential.

Referring to FIGS. 1A and 1B, the lower light-receiving surface of each cell is mostly occupied by a p-type region and is partially occupied by the n⁺-type region 7. Naturally, the concentration of electron-hole pairs which are photo-excited increases toward the surface. Therefore, many electron-hole pairs are excited by light in the p-type region 6. If electrons photo-excited in the p-type region 6. If electrons photo-excited in the p-type region flow without recombination and are absorbed by the n-type region, holes excited by the p-type region 6 are stored and change the region 6 to a positive potential. If the impurity concentration in the p-type region 6 is uniform, photo-excited electrons flow to the p-n⁻ junction between the p-type region 6 and the n⁻-type region 5. Thereafter, the electrons are absorbed in the n-type collector region 1 by a drift due to a strong electric field applied to the n⁻-type region. Note that electrons in the p-type region 6 can be transferred by diffusion alone. However, if the impurity concentration of the p-type base is controlled to increase from the surface to the inside, an electric field given by:

$$Ed = (1/WB) \cdot (kT/q) \cdot \ln: (NAs/NAi)$$

(where WB is the depth of the p-type region 6 from the light-incident surface, k is Bolzmann's constant, T is the absolute temperature, q is the unit charge, NAs is the surface impurity concentration of the p-type base region, and NAi is the impurity concentration at the interface between the p-type region 6 and the n⁻-type high-resistance region 5, directed toward the surface from the inside of the base is formed in the base due to the impurity concentration difference.

If we assume that NAs/NAi>3, transfer of electrons in the p-type region 6 is performed by drift, rather than by diffusion. In order to effectively obtain carriers photo-excited in the p-type region 6 as a signal, the impurity concentration of the p-type region 6 preferably diminishes from the light-incident surface to the inside. When the p-type region 6 is formed by diffusion, the impurity concentration diminishes from the surface to the inside.

A portion of the sensor cell below the light-receiving surface is partially occupied by the n⁺-type region 7. Since the depth of the n⁺-type region 7 is normally about 0.2 to 0.3 μm or less, the amount of light absorbed by the n⁺-type region 7 is not so large and does not present a problem. However, for light having short wavelengths, in particular, for blue light, the presence of the n⁺-type region 7 may lower sensitivity. The impurity concentration of the n⁺-type region 7 is normally designed to be about $1 \times 10^{20}$ cm⁻³ or more. The diffusion distance of holes in the n⁺-type region 7 in which an impurity is doped to a high concentration is 0.15 to 0.2 μm. Therefore, in order to effectively flow holes photo-excited in the n⁺-type region 7 into the p-type region 6, the n⁺-type region 7 also referably has a structure wherein the impurity concentration decreases from the light-incident surface to the inside. When the impurity concentration of the n⁺-type region 7 is as described above, a strong drift electric field directed from the light-incident surface to the inside is generated, and holes photo-excited in the n⁺-type region 7 immediately flow into the p-type region 6. When the impurity concentrations of the n⁺-type region 7 and the p-type region 6 decrease from the light-incident surface to the inside, carriers photo-excited in the n⁺-type region 7 and the p-type region 6 at the light-incident surface side of the sensor cell all serve to generate a photosignal. When the n⁺-type region 7 is formed by impurity diffusion from a silicon oxide film or a polysilicon film in which As or P is doped to a high concentration, an n⁺-type region having a preferable imprity concentration profile as described above can be obtained.

Upon storage of holes, the base potential changes to the emitter potential and then to ground level, where it is clipped. More specifically, the base-emitter path is forward-biased, and clipped at a voltage at which the holes stored in the base begin to flow to the emitter. The saturation potential of the sensor cell is approximately given by the potential difference between the ground potential and the bias potential, which is used to bias the p-type region 6 first to a negative potential. If the n⁺-type region 7 is not grounded and a charge is stored by a photo input in the floating state, the p-type region 6 can store the charge to a potential which is substantially the same as that at the n-type region 1. In the MOS sensor, fixed pattern noise due to variations in the parasitic capacitance of a switching MOS transistor for external read out, and random noise due to a high wiring capacitance or an output capacitance are high, and a satisfactory S/N ratio cannot be obtained. In the photosensor cell of the structure shown in FIGS. 1A, 1B and 2, the voltage stored in the p-type region 6 is externally read out. Since the voltage is relatively high, fixed pattern noise or random noise due to output capacitance are reduced relative to the high voltage. Thus, signals with an excellent S/N ratio can be produced.

Another advantage of the photosensor cell of the above configuration is a provision of non-destructive read out of holes stored in the p-type region 6 due to a low recombination rate between electrons and holes in this region 6. When a voltage VR applied to the electrode 9 during read out is returned to zero volts, the potential of the p-type region 6 is reverse-biased as before application of the voltage VR. Thus, the stored voltage VR generated before light irradiation is maintained unless another light irradiation is performed. When the photosensor cell of the above configuration is used to constitute a photoelectric conversion device, a new system function can be provided.

The time for which the stored voltage Vp can be stored in the p-type region 6 is very long; the maximum storage time is limited by a dark current which is thermally generated in a depletion layer at the junction. This is because the photosensor cell is saturated by a thermally generated dark current. However, in the photosensor cell of the configuration described above, the region of the depletion layer is the n⁻-type region 5 having a low impurity concentration such as about $10^{12}$ cm$^{-3}$ to $10^{14}$ cm$^{-3}$, it has a very good crystallinity and only a small number of electron-hole pairs are thermally generated as compared to a MOS or CCD sensor. Therefore, a dark current is lower than other conventional devices. Thus, the photosensor cell of above-described configuration has low noise.

Refresh operation of the charge stored in the p-type region 6 will be described below.

In the photosensor cell of the configuration described above, as described above, the charge stored in the p-type region 6 is held unless it is read out. Therefore, in order to input new optical information, a refresh operation for erasing the previous charge is required. At the same time, the potential of the floating p-type region 6 must be charged to a predetermined negative potential.

In the photosensor cell having the above configuration, as in the case of the read out operation, a refresh operation is performed by applying a positive voltage to the electrode 9 through the wiring 10. The emitter is grounded through the wiring 8. The collector is set at the ground potential or at a positive potential through the electrode 12.

The charge storage operation, the read out operation, and refresh operation of the photosensor cell having the above basic configuration are as described above.

Figure 3A:
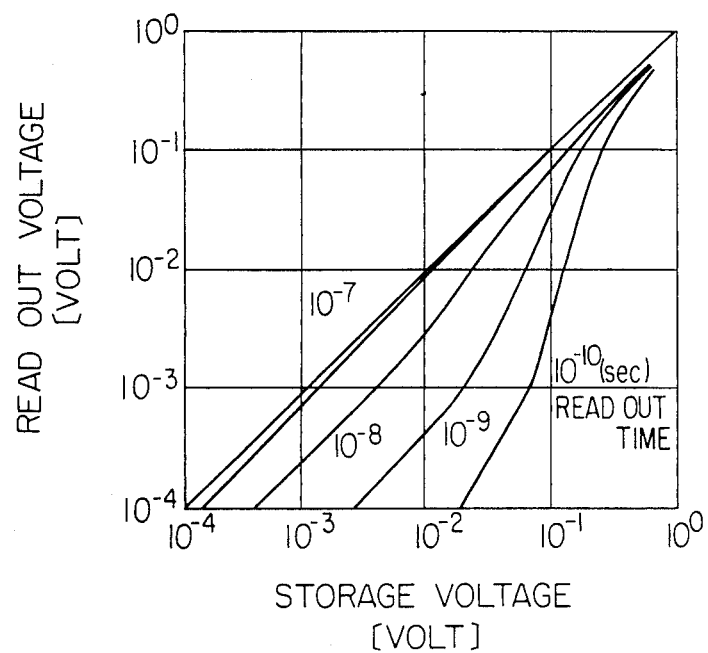
FIG. 3A is a graph showing read out voltage and read out time as a function of storage voltage.
Figure 3B:
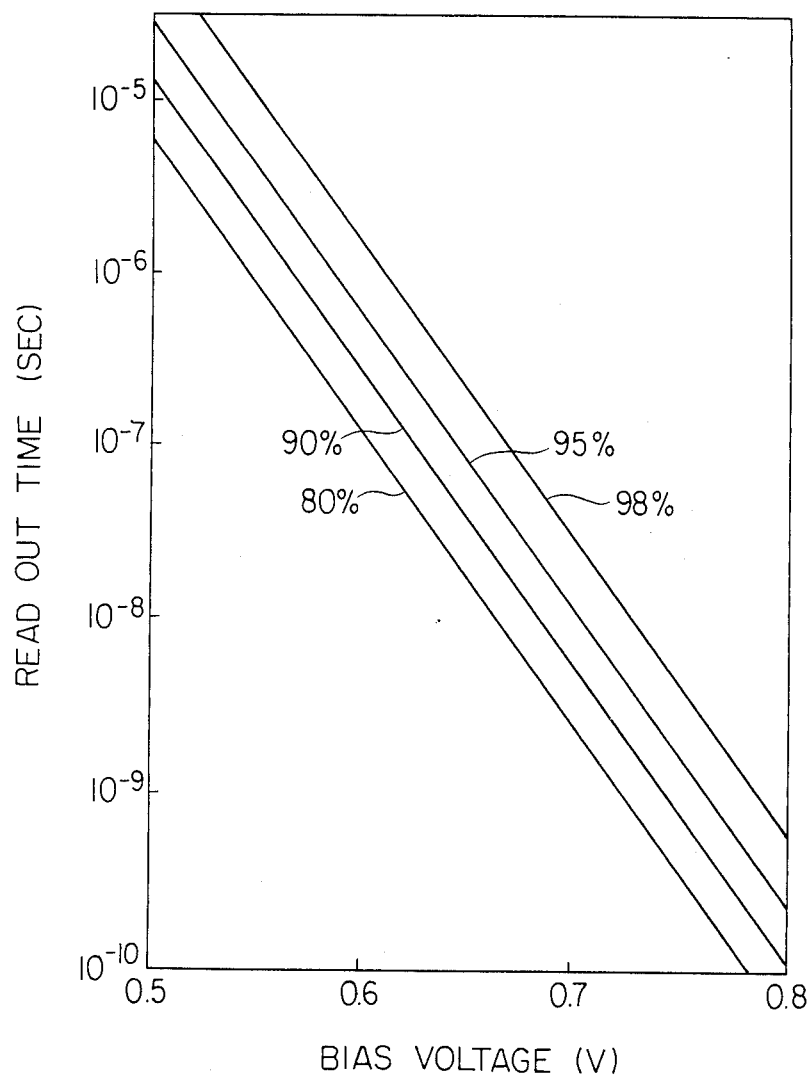
FIG. 3B is a graph showing the read out time as a function of the bias voltage.

FIG. 3A is a graph showing read out voltage and read out time as a function of storage voltage. FIG. 3B is a graph showing read out time as a function of bias voltage.

Figure 4A:
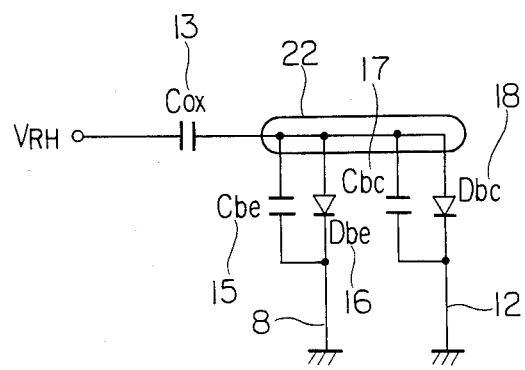
FIG. 4A is an equivalent circuit diagram during a refresh operation.
Figure 4B:
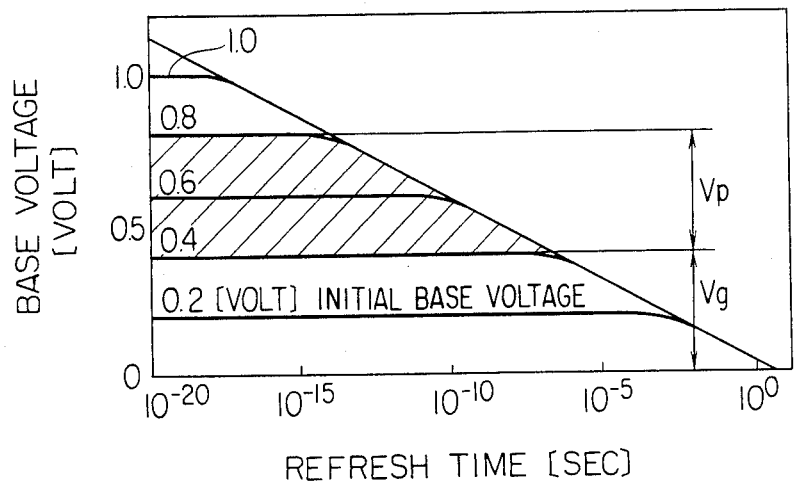
FIG. 4B is a graph showing base voltage as a function of refresh time.

FIG. 4A is an equivalent circuit diagram of the refresh operation, and FIG. 4B is a graph showing base voltage as a function of refresh time.

As described above, the basic structure of the photosensor cell of the above configuration is simpler that those disclosed in Japanese Laid-Open Patent Gazettes Nos. 150878/1981, 157073/1981 and 165473/1981. The structure allows high-resolution applications which are feasible in near future while it also maintains advantages of conventional structures such as low noise, high output, wide dynamic range, and non-destructive read out.

An embodiment of a photoelectric conversion device having two arrays of photosensor cells according to the present invention will be described below.

Figure 5:
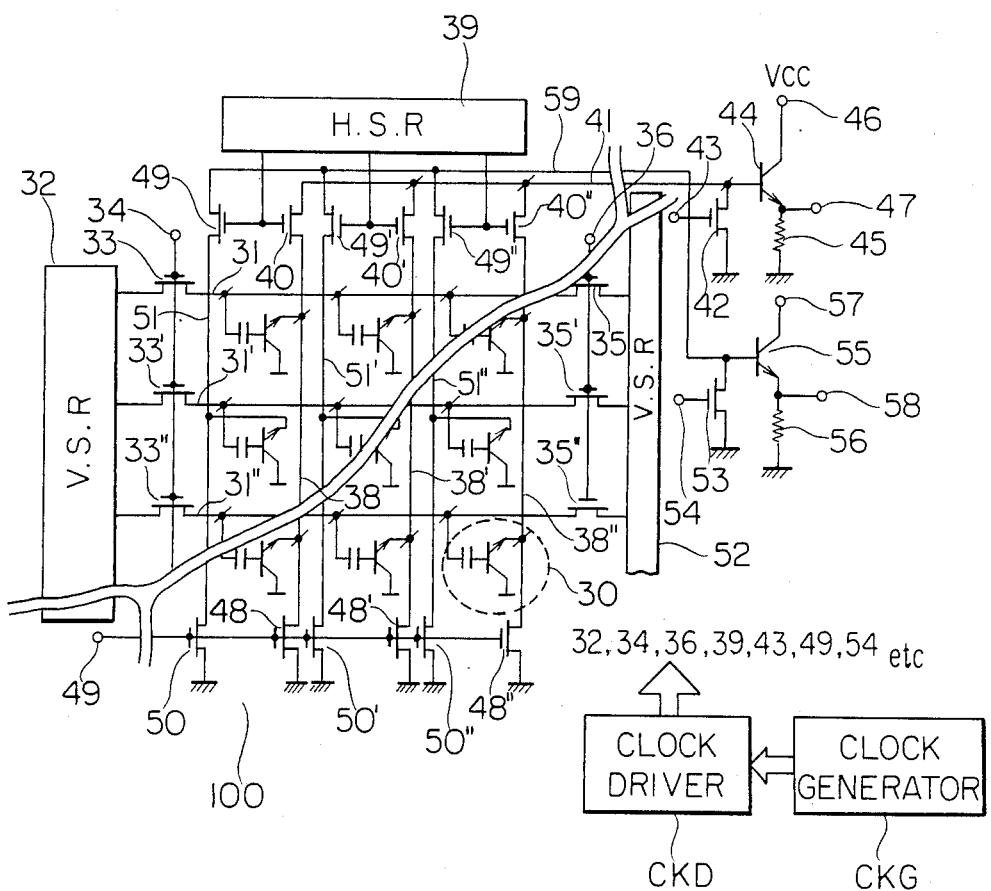
FIG. 5 is a circuit diagram showing an image sensing photoelectric conversion device.

FIG. 5 shows the configuration of a circuit of the photoelectric conversion device having a two-dimensional array (matrix) of basic photosensor cells.

The device has basic photosensor cells 30 (the collector of the bipolar transistor is connected to the substrate and the substrate electrode) surrounded by dotted lines; horizontal lines 31, 31′, 32″, . . . , for applying read out pulses and refresh pulses; a vertical shift register 32 for generating read out pulses; buffer MOS transistors 33, 33′, 33″, . . . , between the vertical shift register 32 and the horizontal lines 31, 31′, 31″, . . . ; a terminal 34 for applying pulses to the gates of the transistors 33, 33′, 33″, . . . ; buffer MOS transistors 35, 35′, 35″, . . . , for applying refresh pulses; a terminal 36 for applying pulses to the gates of the transistors 35, 35′, 35″, . . . ; a vertical shift register 52 for applying refresh pulses; vertical lines 38, 38′, 38″, . . . , and 51, 51′, 51″, . . . , for reading out stored voltages from the basic photosensor cells 30; a horizontal shift register 39 for generating pulses so as to select the respective vertical lines; gate MOS transistors 40, 40′, 40″, . . . , and 49, 49′, 49″, . . . , for enabling or disabling the respective vertical lines; output lines 49 and 51 for reading out the stored voltages to an amplifier section; MOS transistors 42 and 53 for refreshing the charge stored on an output line; terminals 43 and 54 for applying refresh pulses to the MOS transistors 42 and 53, transistors (e.g., bipolar, MOS, FET, J-FET transistors) for amplifying output signals; terminals 46 and 57 for connecting load resistors 45 and 56 and the transistors 44 and 55 to a power source; output terminals 47 and 48 as an output means; MOS transistors 48, 48′, 48″, . . . , and 50, 50′, 50″, . . . , for refreshing the charges stored on the vertical lines 38, 38′, 38″, . . . , and 51, 51′, 51″, . . . ; and a terminal 49 for applying pulses to the gates of the MOS transistors 48, 48′, 48″, . . . , and 50, 50′, 50″, . . .

The image sensing apparatus of the present invention comprises a clock driver CKD for supplying drive pulses to the respective portions 32, 34, 36, 39, 43, 49 and 54 of the photoelectric conversion device, and a clock generator CKG for supplying timing pulses to the clock driver CKD. The clock driver CKD and the clock generator CKG constitute the control means.

Figure 6:
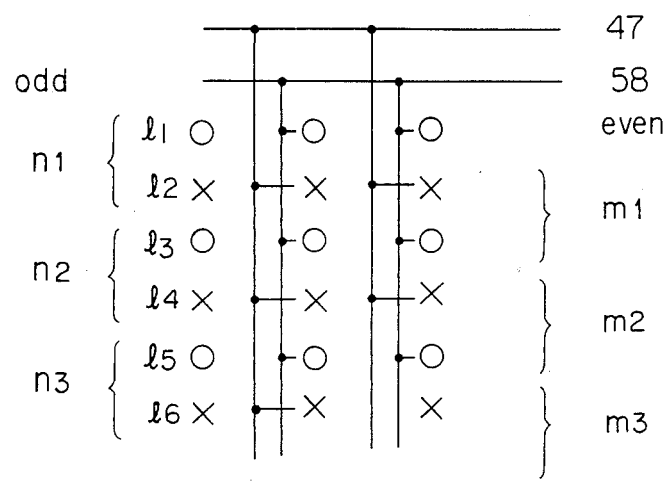
FIG. 6 is a diagram for explaining the drive method of the device shown in FIG. 5.

FIG. 6 is a diagram showing the drive method of the apparatus by the control means. In odd fields, line data l1 and l2 form the n1 horizontal scanning line, line data l3 and l4 from the n2 horizontal scanning line, and line data l5 and l6 form the n3 horizontal scanning line. In even fields, line data l2 and l3 form the m1 horizontal scanning line, line data l4 and l5 form the m2 horizontal scanning line, and line data l6 and l7 form the m3 horizontal scanning line.

Line data of two horizontal lines is simultaneously read out, and the read out data is produced from the output terminals 47 and 58.

Figure 7:
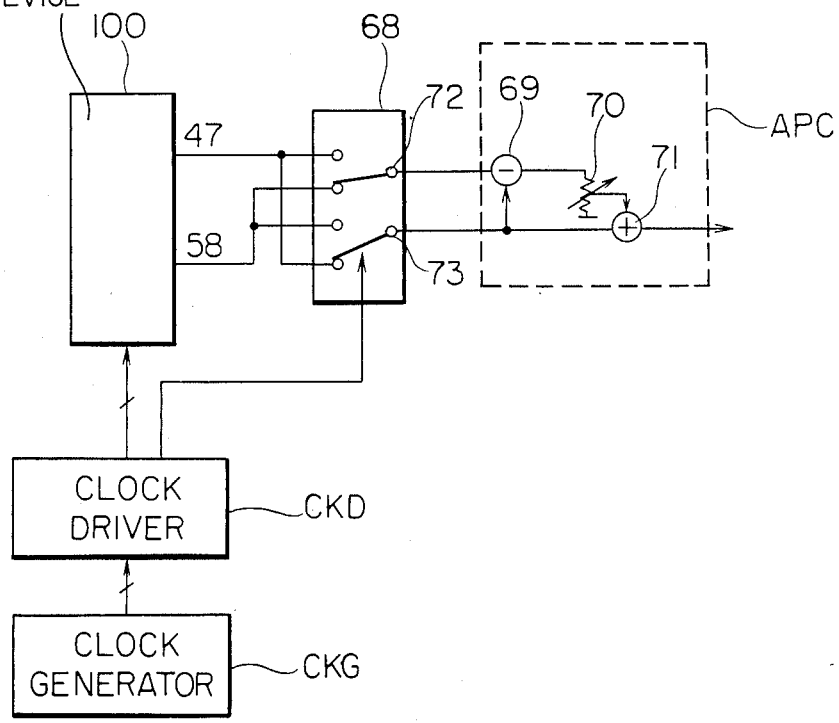
FIG. 7 is a block diagram showing an example of an image sensing apparatus.

FIG. 7 shows the configuration of the image sensing apparatus according to the present invention. The apparatus has a photoelectric conversion device 100 as shown in FIG. 5, a switch circuit 68 for inputting the two line signals from the device 100 to different terminals 72 and 73 for each field, a subtracter 69, a level adjustment resistor 70, and an adder 71. This embodiment of the present invention is also applicable to a conventional X-Y address type MOS image sensor.

In an odd field, an edge signal is obtained by subtracting an output at the terminal 47 from an output from the terminal 58. After the level of the edge signal is adjusted by the resistor 70, it is added with the original signal by the adder 71 so as to obtain an edge-corrected video signal. In an even field, the output from the terminal 58 is subtracted from that from the terminal 47 to obtain an edge signal. After the level of the edge signal is adjusted by the resistor 70, it is added to the original signal by the adder 71.

The clock driver CKD switches the switch 68 for each field. According to the first embodiment of the present invention, edge correction can be performed without using a delay circuit, thereby providing a very simple circuit. APC in FIG. 7 is an edge signal generation block as a processing means or an edge signal generating means.

Figure 8A:
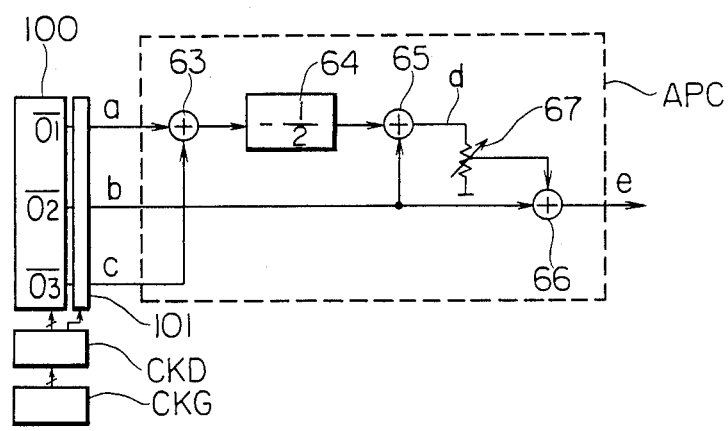
FIG. 8A is a block diagram showing the configuration of a second embodiment of the present invention.

FIG. 8A is a block diagram showing a second embodiment of the present invention. This embodiment uses a photoelectric conversion device which simultaneously reads line information of three horizontal lines.

The same reference numerals as in FIG. 5 denote the same parts in FIG. 8A. In FIG. 8A, a clock driver circuit CKD controls a switch circuit 101.

Figure 8B:
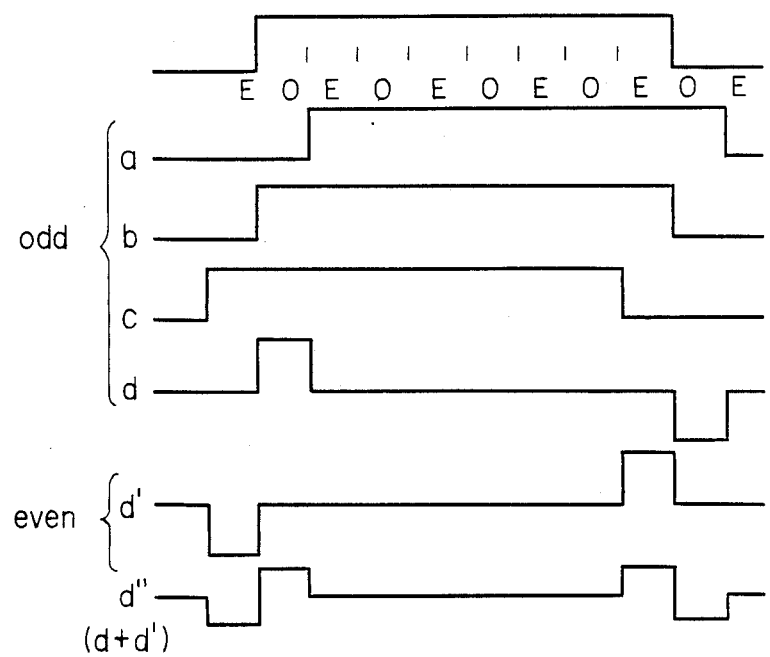
FIG. 8B shows waveforms of signals at respective points in the circuit shown in FIG. 8A.

FIG. 8B shows waveforms of the signals at the respective portions of the circuit shown in FIG. 8A. Charts a to d show the waveforms in odd fields; d', the output waveform from an adder 65 in even field; and d", an edge signal in a frame image.

Figure 9:
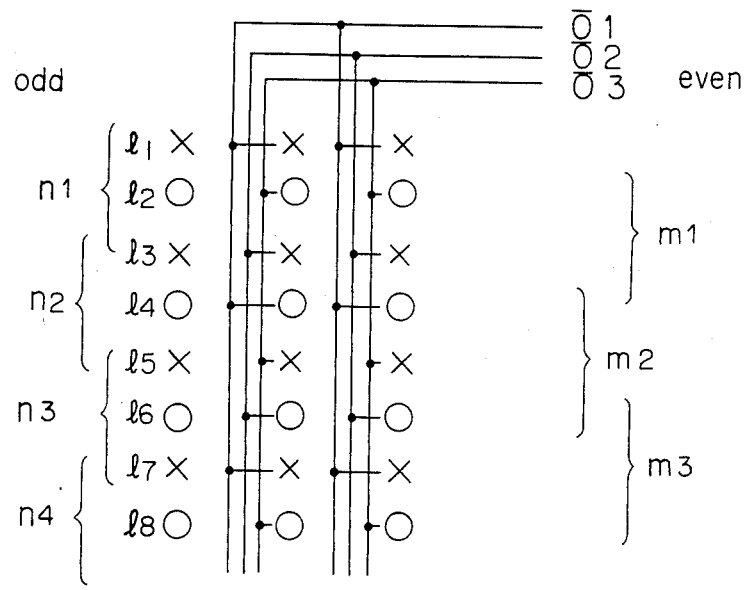
FIG. 9 is a diagram for explaining the drive method of the second embodiment.

FIG. 9 is a diagram showing the wiring of the output line of a photoelectric conversion device 100 and the read out method by the clock driver.

In this embodiment, in an odd field, the clock driver simultaneously reads out lines 11 to 13 as the n1 horizontal scanning line, lines 13 to 15 as the n2 horizontal scanning line, lines 15 to 17 as the n3 horizontal scanning line, and lines 17 to 19 as the n4 horizontal scanning line.

In an even field, the clock driver simultanously reads out lines 12 to 14 as the m1 horizontal scanning line, lines 14 to 16 as the m2 horizontal scanning line, and lines 16 to 18 as the m3 horizontal scanning line.

The following effect will be described by the following method. It is known that a false signal is rarely generated at an edge portion and sensitivity is improved, when vertical correlation processing is performed. In addition, edge correction is easy to perform.

Figure 10:
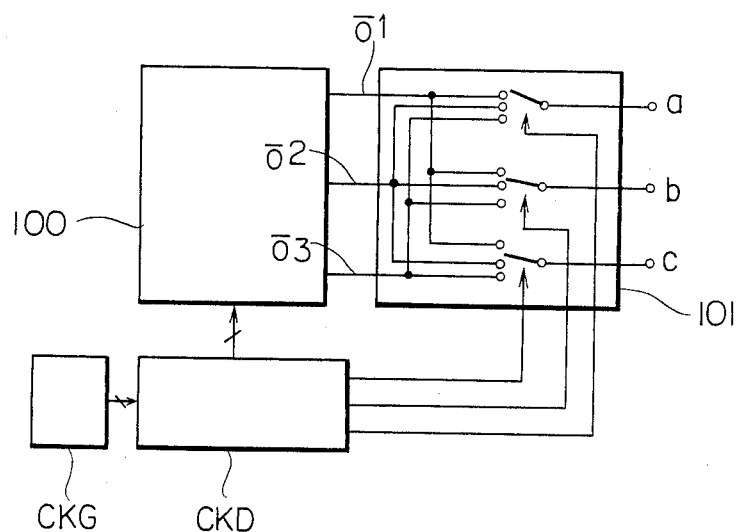
FIG. 10 is a block diagram showing the configuration of a switch circuit 101.

FIG. 10 is a diagram showing the switch circuit 101 for establishing correspondence between output terminals $\overline{O1}$, $\overline{O2}$ and $\overline{O3}$ as an output means of the device 100 and outputs a, b and c in FIG. 8A. The switch circuit 101 has an interior as shown in FIG. 10.

Figures 11, 12:
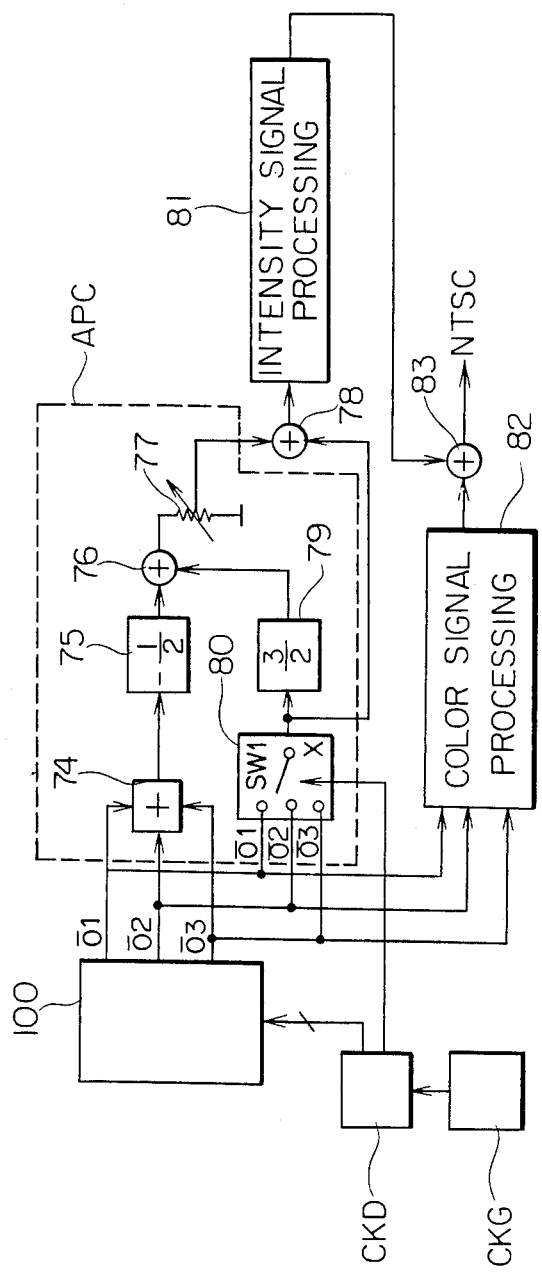
FIG. 11 is a table for explaining the operation of the switch circuit 101.
FIG. 12 is a block diagram showing a third embodiment of the present invention.

The clock driver CKD switches the outputs at timings which are different substantially at each field and each line, as shown in FIG. 11.

In this embodiment, since the switch circuit 101 is arranged, as shown in FIG. 8A, an edge compensation circuit need only be incorporated for one combination of the outputs a, b and c as shown in FIG. 8A. Therefore, the overall construction is simplified FIG. 12 is a block diagram showing a third embodiment of the present invention. The apparatus has adders 74, 76, 78 and 83, weighting circuits 75 and 79, a level adjustment resistor 77, a switch circuit 80, an intensity signal processing circuit 81 as a processing means, and a color signal processing circuit 82 as a processing means.

According to this embodiment, as in the second embodiment, edge correction be performed without using delay lines or the like; and the configuration of the switch circuit 80 can be simplified. In addition, only one series of parts 75 to 79 is required, and the wiring in the device 100 can be simplified.

Figure 13:
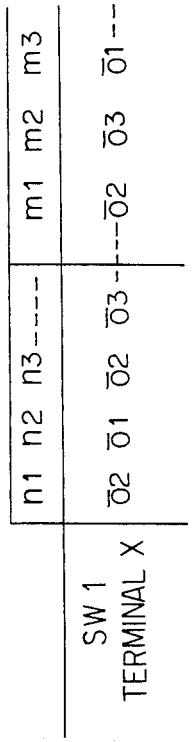
FIG. 13 is a table showing the drive method of a switch circuit 80.

FIG. 13 is a method of controlling the switching operation of the switch circuit 80. As shown in FIG. 13, when three horizontal lines are simultaneously read, the central horizontal line is handled as an original signal, and the upper and lower line signals are delayed and advanced by 1H, respectively.

As described above, according to the embodiment of the present invention, a plurality of lines of a photoelectric conversion device for image sensing an optical image are simultaneously read, and the signals of a plurality of lines are operated to generate an edge-corrected signal. Thus, the signal processing system is simplified extremely.

According to the above embodiment, a switch circuit is arranged for changing the combination of a plurality of line signals when they are supplied to an operation circuit. Therefore, only a single operation circuit is required, and the configuration of the operation circuit is simplified. Connections in the photoelectric conversion device are simplified.

When a photoelectric conversion device capable of non-destructive read out is used, three or more horizontal lines can be simultaneously read out. At the same time, the signals can be read out in a partially overlapped state upon each horizontal scanning, thereby improving vertical correlation. An edge signal of second order or more can be obtained. The switch circuit can be incorporated in the photoelectric conversion device.

As described above, according to the embodiment of the present invention, an edge-corrected signal can be obtained with a simple configuration. Since the vertical correlation distance is small, inclusion of a false signal is rare. Since the apparatus has a switch circuit for switching the output lines of the photoelectric conversion device, the construction of the edge signal generating means and the photoelectric conversion device is simplified.

Figure 14:
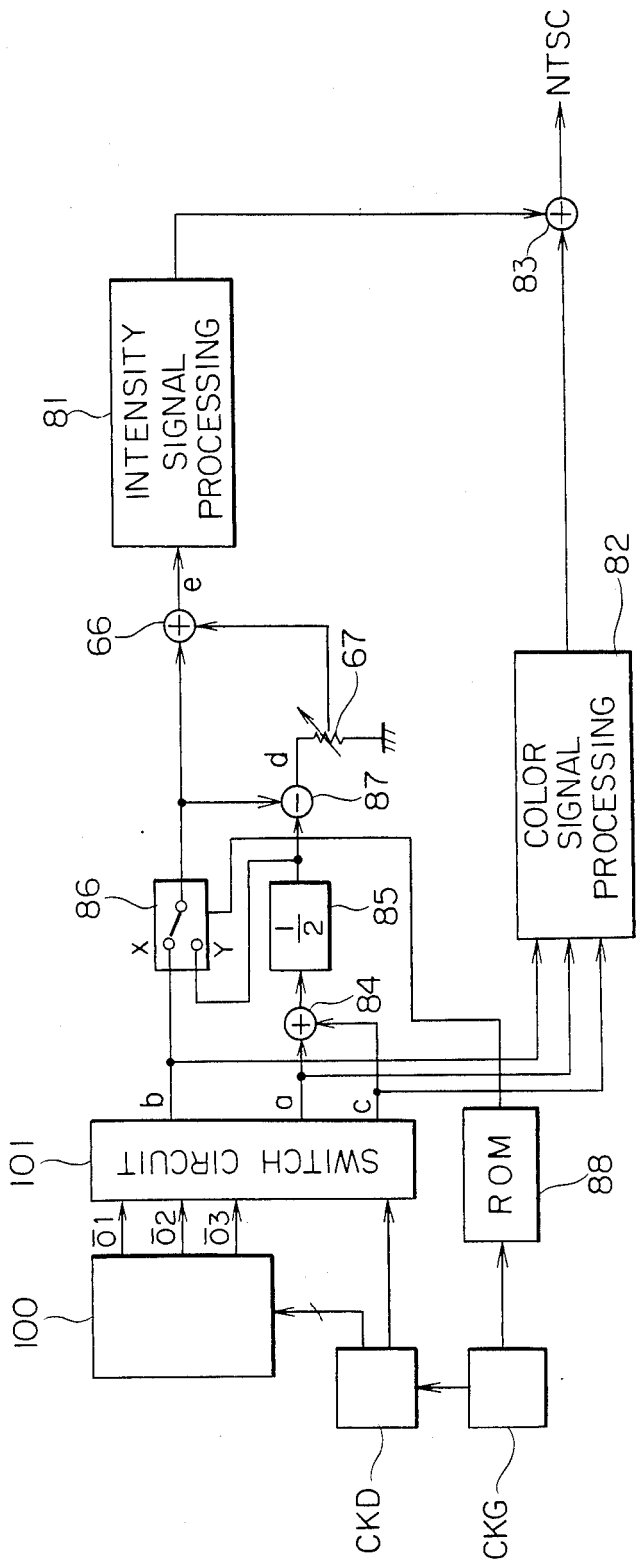
FIG. 14 is a block diagram showing a fourth embodiment of the present invention.
Figure 15A:
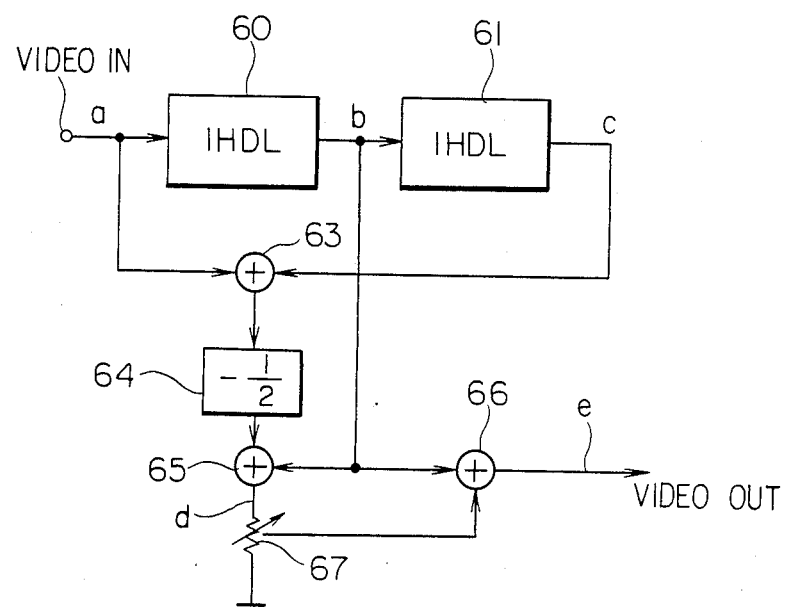
FIG. 15A is a block diagram of a conventional edge compensation circuit.

FIG. 14 shows a fourth embodiment of the present invention. In this embodiment, a defective pixel in a photoelectric conversion device can be corrected. The same reference numerals as in FIG. 13 denote the same parts in FIG. 14.

The apparatus shown in FIG. 14 has an adder 84, a weighting circuit 85, a switch 86 as a switching means, a subtracter 87, and a ROM storing the position of a defective pixel. The parts 84 to 87, 66, 67, and the like constitute a processing means.

A switch circuit 101 converts the three horizontal line signals read out from output terminals $\overline{O1}$, $\overline{O2}$ and $\overline{O3}$ of the device 100 to obtain signals a, b and c as in the case of FIG. 11. The signal b is a signal of the control line of the three horizontal lines read out simultaneously from the photoelectric conversion device. The signal b contains a dropout at a predetermined pixel position.

The position of the defective pixel is prestored in the ROM 88. The ROM 88 is driven by a sync signal from a clock generator CKG. The switch 86 is switched from the x side to the y side at the position of the defective pixel. The signal b is interpolated by an average signal of the signals a and c. The adder 84 and the weighting circuit 85 are for forming an average signal. The average signal is subjected to subtraction at the subtracter 87 to form an edge signal d. The remaining operation is the same as that described with reference to up to FIG. 13. According to this embodiment, correction of a defective pixel can be performed without using a delay line, the circuit configuration is simplified, and the image quality is improved. The manufacturing yield of the photoelectric conversion device can be improved. The dropout of the signal b can be directly detected, and the switch 86 can be detected.

According to the embodiments of the present invention, a defective pixel can be corrected by a simple circuit, and such a defective pixel is replaced with a signal of an adjacent pixel which has a high correlation.

What is claimed is:

1. An image sensing apparatus comprising:
   a photoelectric conversion device consisting of a plurality of photoelectric conversion elements which are arranged in row and column directions and each of which capable of non-destructive read out,
   means for generating a signal representing one image line using signals of a predetermined set of rows of said conversion element, and
   control means for simultaneously reading out signals of said predetermined set of rows for one horizontal scanning, a respective such set of rows being selected for each image line, and said sets of rows belonging to consecutive image lines in one image field partially overlapping with each other.

2. An apparatus according to claim 1, wherein said photoelectric conversion device has a plurality of output means for independently reading out the signals of a plurality of lines.

3. An apparatus according to claim 1, further including means for forming a signal representing one image line using the signals of the plurality of lines which are simultaneously read out by said control means.

4. An apparatus according to claim 1, wherein said signal processing means is one for generating an edge correction signal.

5. An apparatus according to claim 1, wherein said signal processing means is for generating a defect correction signal.

6. An apparatus according to claim 2, wherein said signal processing means comprises the same number of input means as there are said output means, said input means being capable of connecting with respective ones of said output means.

7. An apparatus according to claim 6, further comprising switch means arranged between said plurality of output means and said plurality of input means for switching connections between said output means and said input means in each horizontal scanning.

8. An apparatus according to claim 1, wherein said original process means processes signals of three adjacent rows to generate a correlated signal, and said control means simultaneously reads out signals of said three adjacent rows in each horizontal scanning, each said set of three rows being selected such that said sets partially overlap with each other.

9. An image sensing apparatus comprising:
   (a) a plurality of photoelectric conversion elements which are arranged in a matrix pattern;
   (b) a plurality of output means for independently reading out signals from said plurality of photoelectric conversion elements
   (c) defect memory means for memorizing information as to which (if any) of said photoelectric conversion elements are out of order; and
   (d) defect correction means for correcting, in response to output of said defect memory means, a signal of a defective photoelectric conversion element by utilizing outputs of others of said photoelectric conversion elements which are obtained through said plurality of output means, wherein said other photoelectric conversion elements comprise elements which are adjacent to said defective element in the column direction.

10. An apparatus according to claim 9, wherein said photoelectric conversion elements include elements which are capable of non-destructive read out.

11. An image sensing apparatus, comprising:
    a photoelectric conversion device consisting of a plurality of photoelectric conversion elements which are arranged in row and column directions and each of which is capable of non-destructive readout,
    means for generating a signal representing one image line using signals of a predetermined set of rows of said conversion elements, and
    control means for simultaneously reading out signals of said predetermined set of rows of one horizontal scanning, a respective such set of rows being selected for each image line, and said sets of rows belonging to consecutive image lines partially overlapping with each other,
    wherein said original process means processes signals of three adjacent rows to generate a correlated signal, and said control means simultaneously reads out signals of said three adjacent rows in each horizontal scanning, each said set of three rows being selected such that said sets partially overlap with each other, and
    wherein said signal processing means is for generating a double differentiation edge correction signal from signals of three adjacent rows.

12. An image input arrangement comprising:
    a photoelectric conversion device comprising a plurality of photoelectric conversion elements which are arranged in row and column directions, said elements being capable of non-destructive read out, and
    signal processing means for operating upon signals of three adjacent rows which are read out simultaneously, to generate a double differentiation correction signal.

13. An arrangement according to claim 12, further comprising control means for simutlaneously reading out signals of said three rows in each horizontal scanning, said each set of three rows being selected to partially overlap with another said set.

* * * * *

UNITED STATES PATENT AND TRADEMARK OFFICE
CERTIFICATE OF CORRECTION

PATENT NO. : 4,731,665
DATED : March 15, 1988
INVENTOR(S) : SEIJI HASHIMOTO, ET AL.

It is certified that error appears in the above-identified patent and that said Letters Patent is hereby corrected as shown below:

COLUMN 3

Line 11, "generating may" should read --generating means may--.
    Line 21, "rare. switching" should read --rare. In addition, since the apparatus has a switch for switching--.

COLUMN 4

Line 12, "is" should read --are--.
    Line 40, "ion-implanation" should read --ion-implantation--.
    Line 44, "ion-implanation" should read --ion-implantation--.

COLUMN 5

Line 38, "If electrons photo-" should be deleted.
    Line 39, "excited in the p-type region 6." should be deleted.
    Line 55, "Ed=(1/WB)•(kT/q)•ln:(NAs/NAi)" should read --$E_d=(1/W_B) \cdot (kT/q) \cdot \ln(N_{As}/N_{Ai})$--.
    Line 58, "Bolzmann's" should read --Boltzmann's--.

COLUMN 6

Line 21, "referably" should read --preferably--.
    Line 35, "sillicon" should read --silicon--.
    Line 38, "imprity" should read --impurity--.

COLUMN 8

Line 40, "from" should read --form--.

UNITED STATES PATENT AND TRADEMARK OFFICE
CERTIFICATE OF CORRECTION

PATENT NO. : 4,731,665

DATED : March 15, 1988

INVENTOR(S) : SEIJI HASHIMOTO, ET AL.

It is certified that error appears in the above-identified patent and that said Letters Patent is hereby corrected as shown below:

COLUMN 9

Line 18, "in even" should read --in an even--.
    Line 28, "simultanously" should read --simultaneously--.
    Line 58, "correction be" should read --correction can be--.

COLUMN 11

Line 12, "element," should read --elements,--.
    Line 56, "elements" should read --elements;--.

COLUMN 12

Line 26, "of one" should read --for one--.
    Line 52, "simutlaneously" should read --simultaneously--.

Signed and Sealed this

Nineteenth Day of July, 1988

Attest:

DONALD J. QUIGG

Attesting Officer      Commissioner of Patents and Trademarks